June 20, 1967 P. M. SELINSKY 3,325,932
FILM SLIDE PROJECTOR DISC
Filed July 29, 1965

INVENTOR.
Philip M. Selinsky
BY
Dale A. Winnie
ATTORNEY ited States Patent Office
3,325,932
Patented June 20, 1967

3,325,932
FILM SLIDE PROJECTOR DISC
Philip M. Selinsky, 21112 McClung,
Southfield, Mich. 48075
Filed July 29, 1965, Ser. No. 475,795
4 Claims. (Cl. 40—70)

This invention relates to film slide projectors in general and more particularly to film slide projector discs.

There are several different kinds of devices used for showing film slides. Some require individual handling of the film slides and others hold a group of slides and enable them to be shown in succession one after the other. The latter may be for individual or home use but are also used for commercial purposes.

The commercial type film slide projector normally uses a film slide disc capable of holding a dozen or more different slides on which are provided commercial ads for different products or customer services. Normally, the discs are preloaded with slides, placed in a projector and programmed for thirty seconds or a minute showing, and are cycled around and around, again and again. The slides are usually in color and their beauty and illumination attracts attention and causes the ads to be noticed and read.

One problem with the commercial film slide projector is that the film slide disc must be capable of being quickly loaded and changed and be relatively trouble free to minimize service costs and enable continuous operation without problems. Unloaded discs should be capable of easy storage and a disc, even when loaded, should be capable of stacking for easier handling and preparation for use.

In the past, several different types of film slide discs have been suggested and have been tried without much real enthusiasm for the job they do. Most have been rather expensive and not too easy to handle or use. Usually, side edge loading has been tried and as a consequence the whole disc has to be removed to change any one film slide. Any warping or breakage also created a real problem.

It is an object of this invention to disclose a simplified film slide disc particularly suited for commercial use and which may be made out of good strong stock material to withstand long hard hours of service and use.

It is an object of this invention to disclose a film slide disc which may be made as a flat stamping and which includes means for attaching film slides to an easily accessible side thereof.

It is an object of this invention to provide a film slide disc and means for receiving and retaining slides thereto for easy viewing and servicing, as necessary.

The retaining means are inexpensive to produce and serve also to frame the slides, if desired, and hold them securely in place.

These and other objects and advantages to be gained in the practice of this invention will be better understood and more fully appreciated upon a reading of the following specification and having reference to the accompanying drawing.

Figure 1:
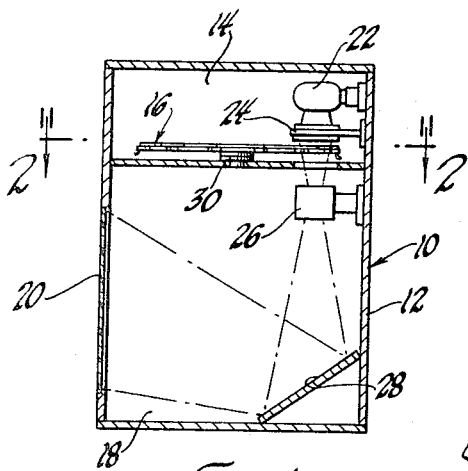
FIGURE 1 is a cross sectional view of a simple type of commercial film slide projector.
Figure 2:
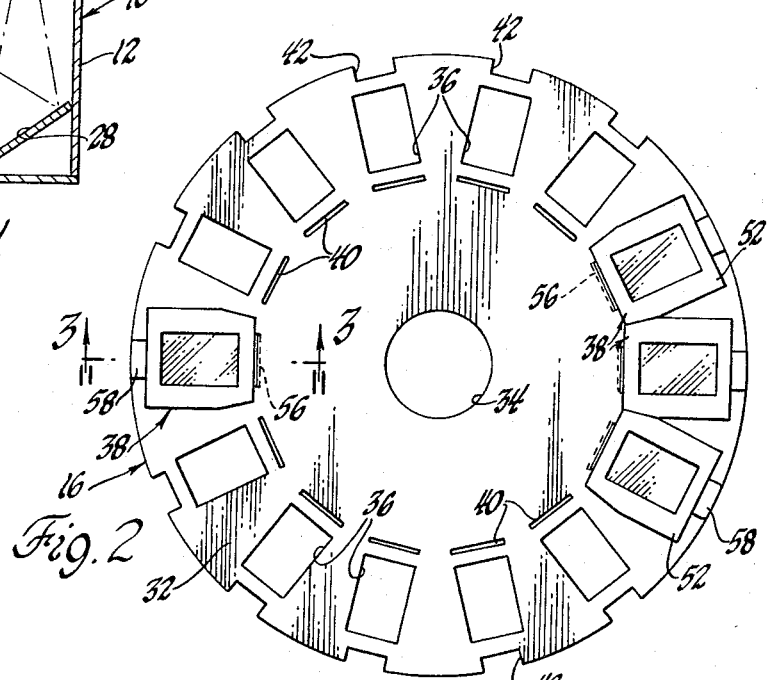
FIGURE 2 is a plan view of the film slide projector disc of this invention with a few slides shown mounted thereon.

The film slide projector 10 of FIGURE 1, is shown as including a box 12 with a compartment space 14 for the film slide disc 16 and a compartment space 18 through which the slide image is projected onto the screen 20. A light source 22 is positioned over a lens 24 which directs the light through a slide on the disc 16. The image passes through another lens 26 on to a reflective surface 28 and hence to the back side of the screen. From the front, outside of the box 12, the slide image is shown considerably enlarged and illuminated on the translucent screen 20.

The film slide disc 16 is mounted on a turntable post or spindle 30 and is programmed, by circuitry not shown, to rotate or progress forward from one slide to the next, in succession or as desired, so that the different slides mounted on the projector disc can be shown on the screen 20 for viewing by the general public.

The film slide disc 16 is shown as including a flat stamping 32 of reasonable thickness, from good plate steel stock, so that it will not get bent or become warped easily. It is circular with a hole 34 in the center for the turn post or spindle 30.

A series of rectangular openings 36 are formed through the disc near its outer periphery and circumferentially therearound. They are each radially oriented and are disposed as will be seen, to receive an individual film slide member 38 thereover and to frame the slide for viewing therethrough.

A slot 40 is formed through the disc 32 in spaced relation and parallel to the inner side edge of each of the openings 36.

A notch 42 is also formed in the outer periphery of the disc adjacent the outer side edge of each opening 36.

The disc 32 with the openings 36, slots 40 and notches 42 is easily and inexpensively formed as a flat stamping. Without any slides mounted on it, it can be stacked flat and is easy to store almost any place.

Figure 3:
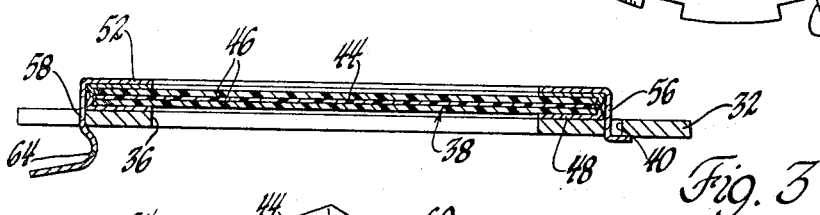
FIGURE 3 is a greatly enlarged cross-sectional view, in the plane of line 3—3 in the last mentioned drawing figure, through one of the slides retained to the projector disc of this invention.
Figure 4:
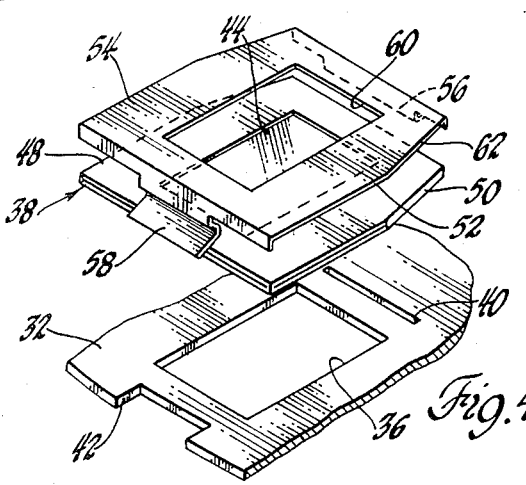
FIGURE 4 is an exploded view of the film slide retainer, a film slide, and a fragmentary part of the projector disc.

Referring now principally to FIGURES 3 and 4:

The film slide member 38 includes the actual film piece 44, between a pair of protective transparent members 46 or such, and is encased in a framing member 48. The framing member is shown as made of metal but it may be of heavy duty paper board or other material if desired and suitable to take the handling and service requirements to which the slides are normally subjected.

It will be noted that the corners are cut, as at 50, on the slides at one end. This serves several purposes, as will be later appreciated.

The slides 38 are held on the disc 32 over the openings 36 by means of slide clip retainers 52. These are simple formed stampings of thin, lightweight, spring metal which include a top wall 54 with spring finger parts 56 and 58 at opposite ends. An opening 60 is formed in the top wall part and it is of the size and shape of the disc openings 36. It also serves a like purpose of framing the film slide member 38 as mounted on the projector disc.

The retainers 52 have the corners cut at one end, as at 62, just like the slides, which serves to help match and align the slides in the retainers. Also, at the same end, the spring finger part 56 is formed and provided for engagement in the disc slots 40. This assures alignment of the retainer and accordingly the film slide member with it.

At the other end of the retainer, the wider end since the corners are not cut, the spring finger part 58 includes a rolled detent 64 positioned sufficiently below the top wall 54 to receive a slide 38 and snap under the edge of the projector disc 32, as best seen in FIGURE 3.

The spring finger part 58 is of a width which matches the width of the notches 42 and, accordingly, it serves to align the outer end of the retainer properly on the projector disc. This, in turn, assures proper alignment of the film slide in the retainer.

The spring finger part 58 is also long enough to enable one to get a finger-tip grip on it to disengage it from the disc 32 and to release the retainer from the projector disc.

The loading or assembly of slides on the projector disc 32 is relatively simple.

Pre-selected slides 38 are engaged in retainers 52 with the matching cut corners 50 and 62 aligned. The spring fingers 56 and 58, and their end wall flanges connecting to the top wall 54, assure a reasonably tight fit of the slide in the retainer; at least sufficient for handling purposes without the two coming apart.

The retainers 52, with the slides in them, are next engaged to the projector disc 32 by engaging the spring finger part 56 in slots 40 and snapping the rolled detent 64 of the spring finger parts 58 over the edge of the disc in the notches 42.

The projector disc 32 shown is capable of holding a total of fourteen slides. They may be all different or there may be repeats of some ads, or whatever combination is desired.

When the whole disc is loaded, it will be noted that the clipped or cut corners of the retainers and slides also help to allow a tighter circle of the slides.

In servicing the projector 10, it is a simple matter to replace the whole disc 16 or to just unsnap one or more of the retainers 52 and replace them with new ones, already loaded with different slides, or to replace just the slides, or to leave the disc opening 36 completely blank, if desired.

From the foregoing, it will be appreciated that numerous objects and advantages are to be obtained from this invention.

Although a preferred embodiment of the invention has been shown and described in detail, such improvements and modifications, as are within the spirit of the invention and are not specifically excluded by the language of the hereinafter appended claims, are to be considered as inclusive thereunder.

I claim:

1. A film slide projector disc, comprising:
a flat disc member having a plurality of film slide framing openings provided therethrough and disposed radially near the outer periphery thereof,
a slot provided through the disc radially inward of said openings and a notch formed next adjacent said openings in the outer periphery of said disc,
and a film slide receptive member including spring finger means at opposite ends thereof for retaining a film slide member thereto,
said spring finger means being engageable in said notch at one end of said slide framing opening and said slot at the other end thereof for positioning and holding a film slide disc properly oriented over the framing opening in said disc.

2. The film slide projector disc of claim 1,
said slide and slide receptive members having their radially inwardly disposed corners thereof chamfered for matching alignment and closer fitting engagement to next adjacently disposed slide and slide receptive members.

3. A film slide projector disc, comprising:
a flat disc member having a centrally disposed opening provided therethrough to receive support means,
a plurality of rectilinear openings formed through said disc and radially oriented circumferentially about said disc near the outer periphery thereof,
a slot formed through said disc in parallel spaced alignment to the inner disposed edge of each of said openings and a notch provided in the peripheral edge of said disc next adjacent the outer disposed edge of each thereof,
a slide retainer member having a slide framing opening provided therethrough and spring fingers at each end thereof for retaining a film slide thereto,
and one of said spring fingers being formed for engagement in one of said slots and the other of said spring fingers for spring engagement in a notch to retain said slide and retainer properly oriented over one of said rectilinear openings.

4. A film slide projector disc, comprising:
a flat disc of circular shape and having a plurality of separate and distinct openings formed therethrough and disposed near the outer periphery thereof and circumferentially therearound,
said openings being of a size and shape to receive and frame a film slide member received thereover,
a retainer member for receiving and holding a film slide member thereto and for cooperative engagement with said disc for holding and disposing a film slide member properly oriented over one of said openings in said disc,
said retainer member having a top wall with a framing opening provided therein and matching the openings in said disc in general size and shape,
spring finger flanges and parts at each end of said retainer member for holding a film slide member therebetween and against the top wall thereof and for engagement with said disc,
a slot formed in said disc adjacent each of the openings therein on one side thereof and notches formed in the periphery of said disc opposite said slots across each of said openings for receiving said spring finger parts in engagement therewith,
said spring fingers at each end of said retainers being of a width matching said slots and said notches, respectively, for proper radial alignment of said slides over said openings,
and a plurality of slides and of said retainers, each having respective corners thereof cut away for easier matching alignment, and for close fitting engagement next adjacent each other on said disc over substantially all of the openings provided therefor.

References Cited

UNITED STATES PATENTS

| | | | |
|---|---|---|---|
| 1,317,946 | 10/1919 | Snively | 40—159 |
| 2,524,306 | 10/1950 | Buzzerd | 40—158 |
| 2,571,584 | 10/1951 | Kurz | 40—70 |
| 2,843,955 | 7/1958 | Engelstein | 40—158 |

EUGENE R. CAPOZIO, *Primary Examiner.*

W. J. CONTRERAS, *Assistant Examiner.*